United States Patent
Bonagiri et al.

(10) Patent No.: US 9,832,081 B2
(45) Date of Patent: *Nov. 28, 2017

(54) ALLOCATING PHYSICAL NODES FOR PROCESSES IN AN EXECUTION PLAN

(71) Applicant: International Business Machines Corporation, Armonk, NY (US)

(72) Inventors: Krishna K. Bonagiri, Andhra Pradesh (IN); Eric A. Jacobson, Arlington, MA (US); Yong Li, Newton, MA (US); Xiaoyan Pu, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 99 days.

This patent is subject to a terminal disclaimer.

(21) Appl. No.: 14/726,195

(22) Filed: May 29, 2015

(65) Prior Publication Data

US 2016/0094417 A1 Mar. 31, 2016

Related U.S. Application Data

(63) Continuation of application No. 14/500,896, filed on Sep. 29, 2014.

(51) Int. Cl.
*G06F 15/173* (2006.01)
*H04L 12/24* (2006.01)
(Continued)

(52) U.S. Cl.
CPC ............ *H04L 41/5054* (2013.01); *G06F 9/44* (2013.01); *G06F 9/48* (2013.01); *G06F 9/50* (2013.01);
(Continued)

(58) Field of Classification Search
CPC . H04L 41/5054; H04L 67/10; H04L 41/0843; H04L 29/08; G06F 9/50; G06F 9/48; G06F 9/44; G06F 9/44505
See application file for complete search history.

(56) References Cited

U.S. PATENT DOCUMENTS 6,311,265 B1 * 10/2001 Beckerle .................. G06F 8/20
712/203
7,065,764 B1 6/2006 Prael et al.
(Continued)

FOREIGN PATENT DOCUMENTS

JP 5007050 8/2012

OTHER PUBLICATIONS

Office Action dated Jul. 28, 2016, for U.S. Appl. No. 14/500,896, filed Sep. 29, 2014, invented by Krishna K. Bonagiri et al., Total 24 pages.

(Continued)

*Primary Examiner* — Cheikh Ndiaye
(74) *Attorney, Agent, or Firm* — David W. Victor; Konrad, Raynes, Davda and Victor LLP

(57) ABSTRACT

Provided are a computer program product, system, and method for allocating physical nodes for processes in an execution plan. An execution plan is generated indicating a plurality of processes. A resource requirement is generated indicating requested physical nodes and an assignment of the processes to execute on the requested physical nodes. A determination is made from the resource requirement of a resource allocation of physical nodes for the requested physical nodes and the processes. The execution plan is updated to generate an updated execution plan indicating the physical nodes on which the processes will execute according to the received resource allocation.

10 Claims, 7 Drawing Sheets

(51) Int. Cl.
*H04L 29/08* (2006.01)
*G06F 9/44* (2006.01)
*G06F 9/48* (2006.01)
*G06F 9/50* (2006.01)
*G06F 9/445* (2006.01)

(52) U.S. Cl.
CPC .......... *H04L 67/10* (2013.01); *G06F 9/44505* (2013.01); *H04L 41/0843* (2013.01)

(56) References Cited

U.S. PATENT DOCUMENTS

| | | | |
|---|---|---|---|
| 7,203,746 | B1 | 4/2007 | Harrop |
| 8,281,012 | B2 | 10/2012 | Pu et al. |
| 8,296,419 | B1 | 10/2012 | Khanna et al. |
| 8,706,798 | B1 | 4/2014 | Suchter et al. |
| 8,719,415 | B1 * | 5/2014 | Sirota .................. G06F 9/5061 709/221 |
| 2005/0005272 | A1 | 1/2005 | Moody et al. |
| 2009/0193427 | A1 * | 7/2009 | Pu ........................ G06F 9/5072 718/104 |
| 2011/0061057 | A1 | 3/2011 | Harris et al. |
| 2012/0096468 | A1 | 4/2012 | Chakravorty et al. |
| 2012/0167112 | A1 | 6/2012 | Harris et al. |
| 2014/0208327 | A1 | 7/2014 | Cadambi et al. |

OTHER PUBLICATIONS

A. Awadallah, "Big Data's New Use Cases Transformation, Active Archive, and Exploration", dated Feb. 21, 2013, (online), Retrieved from the Internet at URL>http://blog.cloudera.com/blog/2013/02/big-datas-new-use-cases-transfor . . . Total 5 pages.

T. Waller Et al., "CloverETL Designer User's Guide", dated 2014, (online) retrieved from the Internet at URL> http://www.cloveretl.com/documentation/designer/4-0-0-M2/CloverETLDesigner-UserGuide-4_0_0_030M2.pdf, Total 1110 pages.

"DataStage Configuration File FAQ", dated Jul. 10, 2012, (online) retrieved from the Internet at URL> http://blogswalkingtree.in/2010/07/02/datastage-config-faq/, Total 7 pages.

"Conductor Node, Section Leaders and Players", dated Sep. 1, 2014, (online), retrieved from the Internet at URL>http://datastageinfoguide.blogspot.com/2013/10/know-about-conductor- . . . 1, Total 3 pages.

IBM, "InfoSphere DataStage Parallel Jobs: Understanding the Content of the APT_DUMP_SCORE Report", dated Jul. 14, 2014, (online), retrieved from the Internet at URL>http://www-01.ibm.com/support/docview.wss?uid=swg21595704 . . . , Total 8 pages.

"InfoSphere Information Server How To", dated Sep. 1, 2013, (online) retrieved from the Internet at URL> http://infospheredatastage.blogspot.com/2013/09/conductor-and-comput . . . , Total 3 pages.

S. Swoyer, "Using Hadoop to Turbocharge ETL the Smart Way", dated 2013, (online) retrieved from the Internet at URL> http://events.pentaho.com/TDWI-ETL-Article.html, Total 2 pages.

English Translation of JP5007050, published Aug. 8-22, 2012, Total 20 pages.

List of Patents or Patent Applications Treated as Related, Total 2 pp., May 29, 2015.

US Patent Application, dated Sep. 29, 2014, for U.S. Appl. No. 14/500,896, filed Sep. 29, 2014, invented by Krishna K. Bonagiri et al., Total 34 pages.

Preliminary Amendment, dated May 29, 2015, for U.S. Appl. No. 14/500,896, filed Sep. 29, 2014, invented by Krishna K. Bonagiri et al., Total 9 pages.

Response to Office Action, dated Oct. 26, 2016, for U.S. Appl. No. 14/500,896, filed Sep. 29, 2014, invented by Krishna K. Bonagiri et al., Total 16 pages.

Final Office Action, dated Feb. 6, 2017, for U.S. Appl. No. 14/500,896, filed Sep. 29, 2014, invented by Krishna K. Bonagiri et al., Total 17 pages.

Response to Final Office Action, dated Apr. 18, 2017, for U.S. Appl. No. 14/500,896 filed Sep. 29, 2014, invented by Krishna K. Bonagiri et al., Total 11 pages.

Notice of Allowance, dated May 30, 2017, for U.S. Appl. No. 14/500,896 filed Sep. 29, 2014, invented by Krishna K. Bonagiri et al., Total 13 pages.

* cited by examiner

```
{
 node "node1"
 {
  fastname "$HOST_NAME1"
  pool "" "a"
  resource disk "/home/kbonagir/yarn_aug1/orch_master/pds_files/node0" { pool "" "export"
           "node0" "node0a" "sasdataset" }
 }
 node "node2"
 {
  fastname "$HOST_NAME2"
  pool "" "b"
  resource disk "/home/kbonagir/yarn_aug1/orch_master/pds_files/node1" { pool "" "export"
           "node1" "node1a" "sasdataset" }
 }
}
```

ALLOCATING PHYSICAL NODES FOR PROCESSES IN AN EXECUTION PLAN

CROSS-REFERENCE TO RELATED APPLICATION

This application is a continuation of U.S. patent application Ser. No. 14/500,896, filed Sep. 29, 2014, which application is incorporated herein by reference in its entirety.

BACKGROUND OF THE INVENTION

1. Field of the Invention

The present invention relates to a computer program product, system, and method for allocating physical nodes for processes in an execution plan.

2. Description of the Related Art

To run an application job involving multiple processes that execute in parallel, such as an Extract Load and Transform ("ETL") job, a job executor reads a description of the configuration file template to determine the number of nodes on which processes will run. The job executor requests an allocation of nodes to run the job from a resource management tool, which then sends the job executor the node names that may be selected for the job. A user may then prepare a configuration file with actual node names selected from those provided by the resource management tool. The configuration file may allocate to different nodes a physical node, also known as a "fastname", and a pool to which the node is assigned. The configuration file thus specifies actual physical resources to allocate in advance to the job before the execution plan is generated.

Using the configuration file, an execution plan may then be generated from the job description indicating the parts or partitions of the processes of the job to run on the selected nodes identified in the configuration file. The execution plan is then run to execute the processes on the selected node.

With ETL jobs, the processing may be partitioned at the nodes, where a conductor drives the entire job. Under the conductor there are section leaders, one section leader for each node, and there are multiple players for each section leader, or independent processes, that run on the same node as the section leader. Thus, the execution plan will require that players for the section leader are all assigned to the same node, which will comprise the physical node specified in the configuration file.

SUMMARY

Provided are a computer program product, system, and method for allocating physical nodes for processes in an execution plan. An execution plan is generated indicating a plurality of processes. A resource requirement is generated indicating requested physical nodes and an assignment of the processes to execute on the requested physical nodes. A determination is made from the resource requirement of a resource allocation of physical nodes for the requested physical nodes and the processes. The execution plan is updated to generate an updated execution plan indicating the physical nodes on which the processes will execute according to the received resource allocation.

DETAILED DESCRIPTION

With the prior art implementation, resources and nodes are selected before the execution plan is prepared, and then included in the execution plan. Thus, when the execution plan is initiated with the previously selected nodes, the selected nodes at the time the execution plan is run may not have sufficient resources to execute the processes specified in the execution plan. If a node on which the processes of the execution plan is too busy, then the process execution may be delayed, which may result in job failure or longer completion time. With the prior art implementations, reserving a node for a single application may waste node resources available on a node and running multiple applications on one node may lead to contention if the node does not have sufficient capacity and resources at the time of execution.

Described embodiments address the prior art problems of pre-allocating nodes in advance of preparing the execution plan. Described embodiments allow running of parallel processes of a job on a dynamically allocated set of nodes by preparing the execution plan with dummy node names or placeholders and then replacing the dummy node names with the actual node names. In this way, the physical nodes are allocated after the execution plan is generated. Further, with described embodiments, when all of the related processes cannot be accommodated on the same node machine, resources on different nodes may be requisitioned for some of the processes so the processes may run on multiple nodes to avoid failure or delays due to overloading too many processes on one node at execution time.

Figure 1:
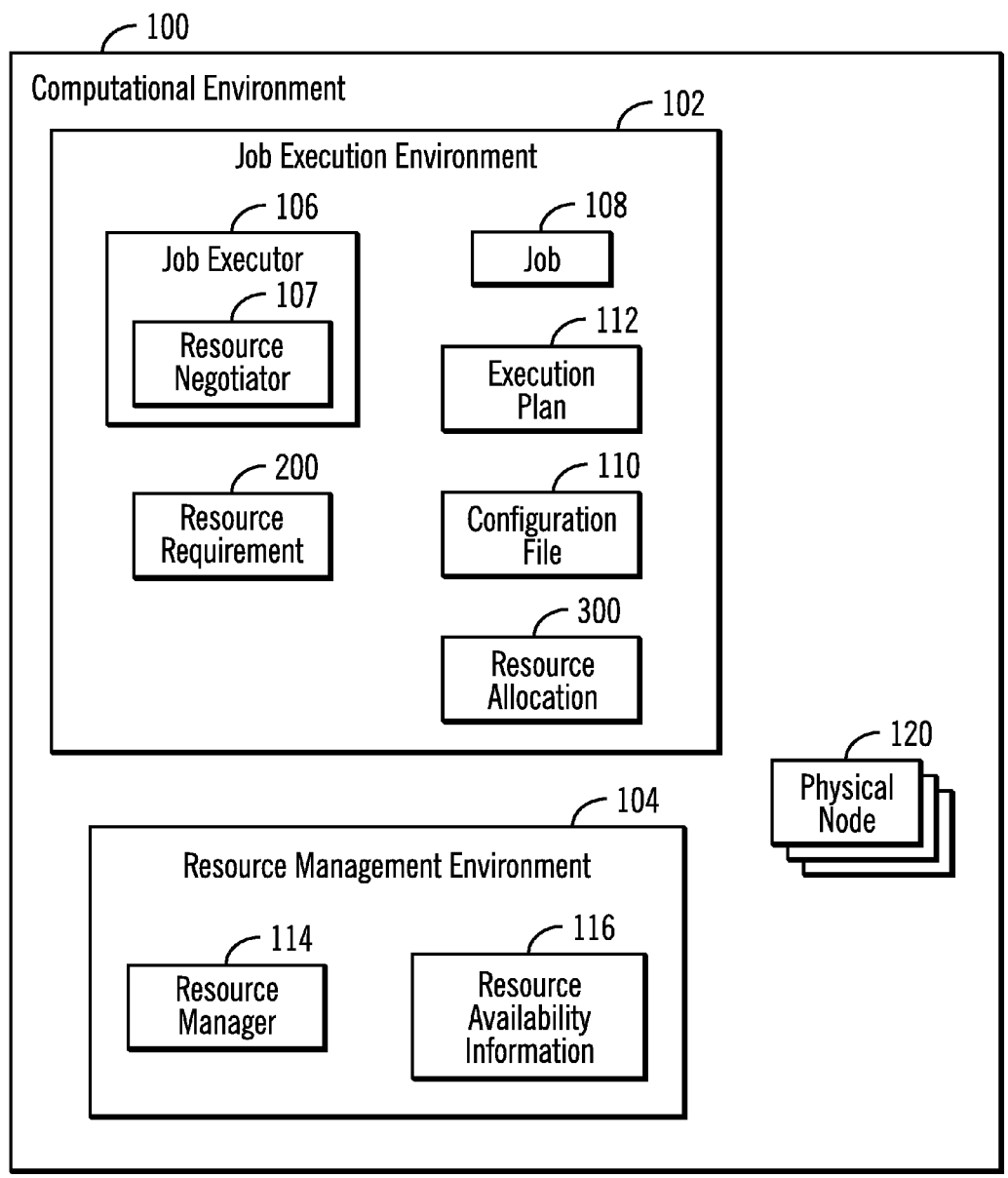
FIG. 1 illustrates an embodiment of a computational environment, including a job execution environment and resource management environment.

FIG. 1 illustrates an embodiment of a computational environment 100 having a job execution environment 102 and a resource management environment 104. The job execution environment 102 includes a job executor 106 that processes a job 108, such as an application or program, e.g., an Extract Transform and Load ("ETL") program, to determine the processes and flow of the job 108. The job executor 106 may process a configuration file template 110 specifying requested section leader nodes to be assigned to the processes of the job 108. The job executor 106 may process a job description of the job 108 to generate an execution plan 112 indicating processes to execute on the requested section leader nodes designated in the configuration file template 110.

In one embodiment, the execution plan 112 may specify various processes that may execute in parallel to perform different operations of the job 108, including section leaders and players. A section leader creates and manages player processors which perform the actual job 108 execution. The section leaders also manage communication among the player processes and the conductor process. The players comprise one or more logical groups of processes used to execute the data flow logic. All players are created and may execute on a same physical node as the section leader. A conductor is a main process that starts the job 108, determines resource requirements, assigns players to nodes, creates the section leader processes, and acts as a single coordinator for status and error messages.

The job executor 106 includes a resource negotiator 107 to request actual physical nodes 120 with sufficient resources on which to execute the determined processes in the execution plan 112, e.g., section leaders and players, from a resource manager 114, where in the execution plan 112, the processes are designated to operate on requested section leader nodes for which there is not yet an allocated physical node 120. In order to request physical nodes that meet the job resource requirement from the resource manager 114, the job executor 106 may construct a resource requirement 200 having information on the processes (e.g., section leaders and players) required by the job 108, which is processed by a resource negotiator 107 to determine how to allocate physical nodes to the processes in the execution plan 112. Once determining an allocation, the resource negotiator 107 would request the specific physical node allocation 120 from the resource manager 114.

The resource management environment 104 includes the resource manager 114 and resource availability information 116 having information on a remaining or current availability of resources in the physical nodes 120. The resource manager 114 provides the resource negotiator 107 resource availability information 116, which the resource negotiator 17 uses to determine the physical nodes having sufficient available resources to allocate to the processes in the execution plan 112. The resource manager 114 would then perform the allocation as requested by the resource negotiator 107.

In response to the resource requirement 200, the resource negotiator 107 determines the allocation of physical nodes 120 to processes in the execution plan 112, requests the resource manager 114 to implement the determined allocation, and then generates manager a resource allocation 300 having the determined allocation of physical nodes to processes to return to the job executor 106 to use to update the execution plan 112 to reflect the actual assigned physical nodes.

The computational environment 100 in which the job execution environment 102 and resource management environment 104 are implemented may comprise one or more servers. If multiple servers are used to implement the environment 100, then the servers may communicate over a network, such as a Storage Area Network (SAN), Local Area Network (LAN), Intranet, the Internet, Wide Area Network (WAN), peer-to-peer network, wireless network, arbitrated loop network, etc. The environment may include storage resources comprising one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices in which the storage resources are implemented may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc.

The physical nodes 120 may each comprise a separate computing resource, such as a physical server or computer having an operating system to independently execute processes, such as a conductor, section leader, and players. In further embodiments, the physical nodes 120 may comprise a virtual machine providing a virtualization of an independent system. The physical nodes 120 may comprise a mixture of dedicated systems and virtual machines.

Figure 2:
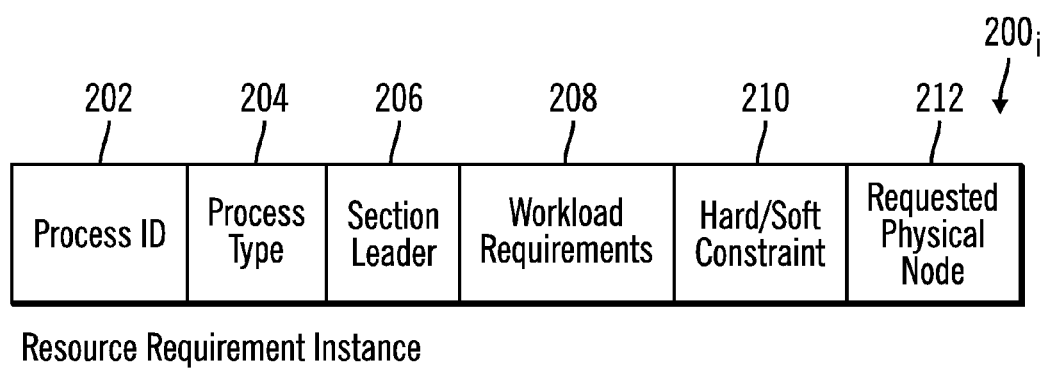
FIG. 2 illustrates an embodiment of a resource requirement instance.

FIG. 2 illustrates an embodiment of a resource requirement instance 200, included in the resource requirement 200 generated by the job executor for one of the processes in the execution plan 112. Each resource requirement instance 200, may include a process identifier (ID) of the process in the execution plan 112; a process type 204 indicating a type of the process 202, such as conductor, section leader or player; a section leader 206 if the type 204 is a player to indicate the section leader 206 of the player; workload requirements 208 indicating an estimated consumption of computational, storage and network resources the process 202 requires to operate; a hard or soft constraint 210 indicating whether the requirement that the player 202 execute on the same physical node as the section leader 206 is a preference that can be relaxed or is a hard constraint that cannot be relaxed and must be implemented; and a requested physical node 210 that was initially assigned to execute the job 108. The resource requirement instance $200_i$ may also indicate the requested physical node 212 indicated in the execution plan 112 to execute the process 202.

For the hard or soft constraint field 210, the soft constraint for the player indicates a preference to allocate the player to the physical node on which the section leader 206 for the player is allocated, with understanding that the requirement can be relaxed if the resource manager 114 cannot locate one physical node having sufficient resources for all the players of the section leader. The hard constraint 210 for the player indicates that the resource manager 114 is required to assign the player to the physical node including the section leader for the player and fail the resource allocation and job execution if the hard constraint cannot be met.

Figure 3:
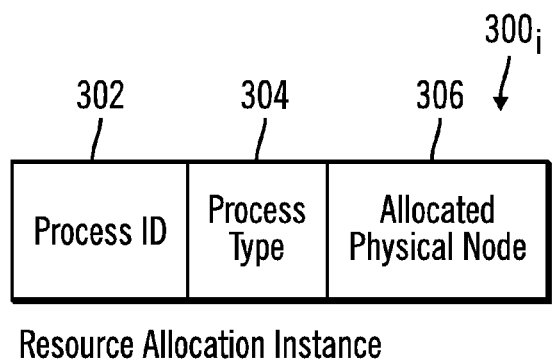
FIG. 3 illustrates an embodiment of a resource allocation instance.

FIG. 3 illustrates an instance $300_i$ of the resource allocation 300 the job executor 106 or resource negotiator 107 may generate to provide information on an allocation of a physical node 120, including a process identifier 302 for which the allocation is provided; a process type 304, e.g., section leader and player; and an allocated physical node 306 to which the process 302 is assigned.

Figures 4, 5:
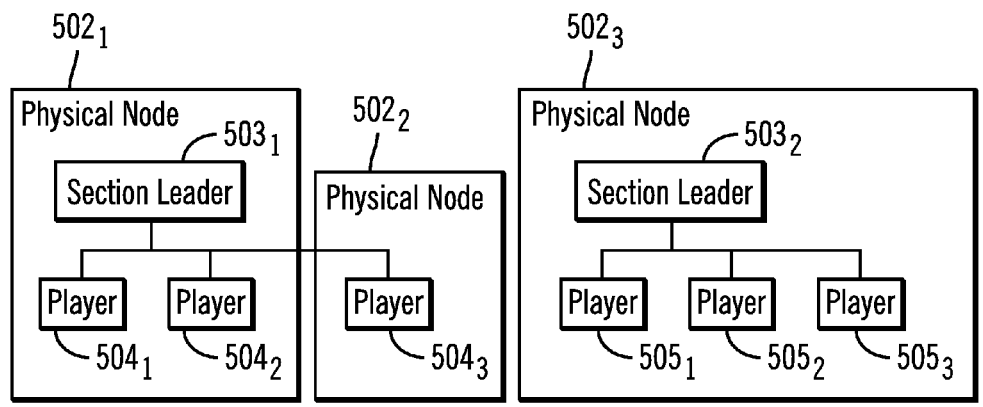
FIG. 4 illustrates an example of an embodiment of a configuration file.
FIG. 5 illustrates an example of an embodiment of an allocation of section leaders and players to physical nodes.

FIG. 4 is an example of a configuration file template 400, such as configuration file template 110, that may be created by a user to specify request nodes on which the processes, e.g., players, will execute. In the example of FIG. 4, the configuration file 400 provides placeholder or dummy names for the physical node name denoted as "fastname". Thus, in FIG. 4, the names "$HOST_NAME1" and "$HOST_NAME2" are placeholder or dummy names of a physical node to be later determined and inserted in the place of the dummy or placeholder name. Providing a placeholder name allows the resource manager 114 to provide the actual physical node that will be used for the requested physical node after the execution plan 112 is determined, instead of having a user specify the physical node to use before the execution plan is determined. Other elements in the configuration file include a "pool" to which the node may be assigned and a resource disk identified by a path name to which data can be read or written. The configuration file template 110 may be in a format different than shown in FIG. 4 or include additional information.

FIG. 5 provides example of a illustration of the allocation, including multiple physical nodes $502_1$, $502_2$, $502_3$ for two section leaders $503_1$, $503_2$, each having three players $504_1$, $504_2$, $504_3$ and $505_1$, $505_2$, $505_3$. In the example allocation of FIG. 5, for section leader $503_1$ one of its players $504_3$ is allocated to a different physical node $502_2$ than the physical node $502_1$ including the section leader $503_1$. For the section leader $503_2$, the resource manager 114 was able to allocate all its players $505_1$, $505_2$, $505_3$ to a single physical node $502_3$.

With described embodiments, although the preference through the soft constraint is that all players be allocated the same physical node as their section leader, the resource manager 114 may allocate players having the soft constraint to a different physical node than the section leader if there are not sufficient physical node resources available to assign all players to the same physical node as their section leader. Thus, with described embodiments, players having the soft constraint setting may be assigned to one or more physical nodes that are not allocated to the section leader. Players having the hard constraint setting may not be allocated to a physical node not including the section leader.

Figure 6:
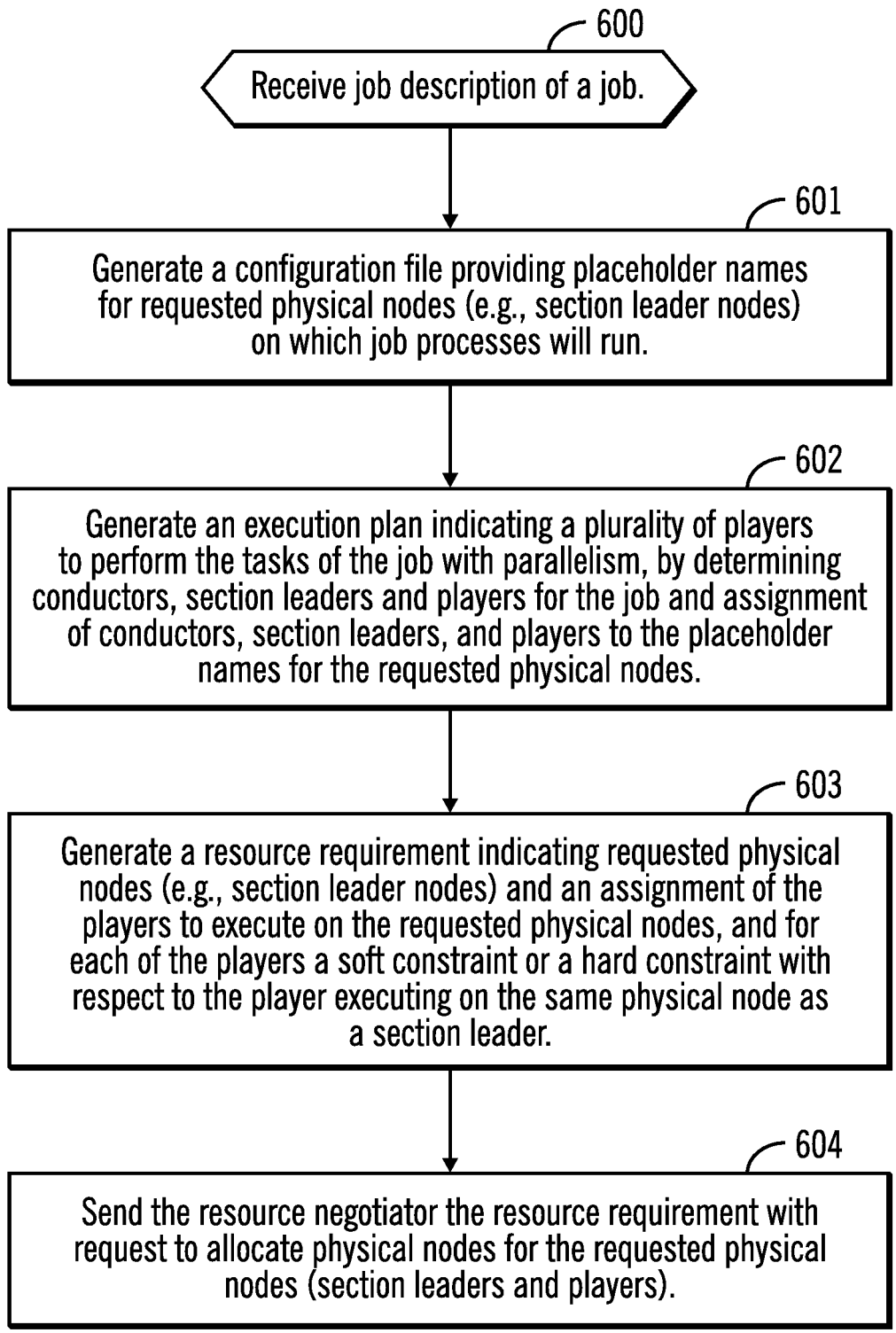
FIG. 6 illustrates an embodiment of operations to generate and send a resource requirement with a request to allocate physical nodes for requested section leader nodes.

FIG. 6 illustrates an embodiment of operations performed by the job executor 106 to generate the execution plan 112 and the resource requirement 200 for use in requesting the resource manager 114 to allocate resources. Upon receiving (at block 600) a job description for the job 108, such as an ETL job having multiple parallel processes, the job executor 106 receives (at block 601) a configuration file template 110 providing placeholder names for requested physical nodes, e.g., section leader nodes, on which job processes will run. The configuration file template 110 may be received from a user. The job executor 106 may generate a configuration object used to access the information supplied by the user in the configuration file template 110. The number of section leader nodes on which the processes will run may be supplied by a user or determined by processing a job description of the job 108. The job executor 106 generates (at block 602) an execution plan 112 indicating a plurality of players to perform the tasks of the job with parallelism, by determining conductors, section leaders and players for the job 108, and assignment of section leaders and players to the placeholder names for the requested section leader nodes. The job executor 106 generates (at block 603) a resource requirement 200 indicating requested section leader nodes and an assignment of the players to execute on the requested section leader nodes, and for each of the players a soft constraint or a hard constraint 210 with respect to the player executing on the same physical node as a section leader. The soft or hard constraint may be determined by processing the requirements of the players. The job executor 106 generates for each process, e.g., section leader and player, a resource requirement instance 200, providing the information for the players in the fields 202, 204, 206, 208, 210, 212. The information such as the workload requirements 208, section leader 206, and hard/soft constraint 210 may be determined by processing the execution plan 112 and job description of the job 108. After creating the resource requirement 200, the job executor 106 sends (at block 604) the resource negotiator 107 the resource requirement with request to allocate resources on physical nodes 120 for the requested section leader nodes.

Figure 7:
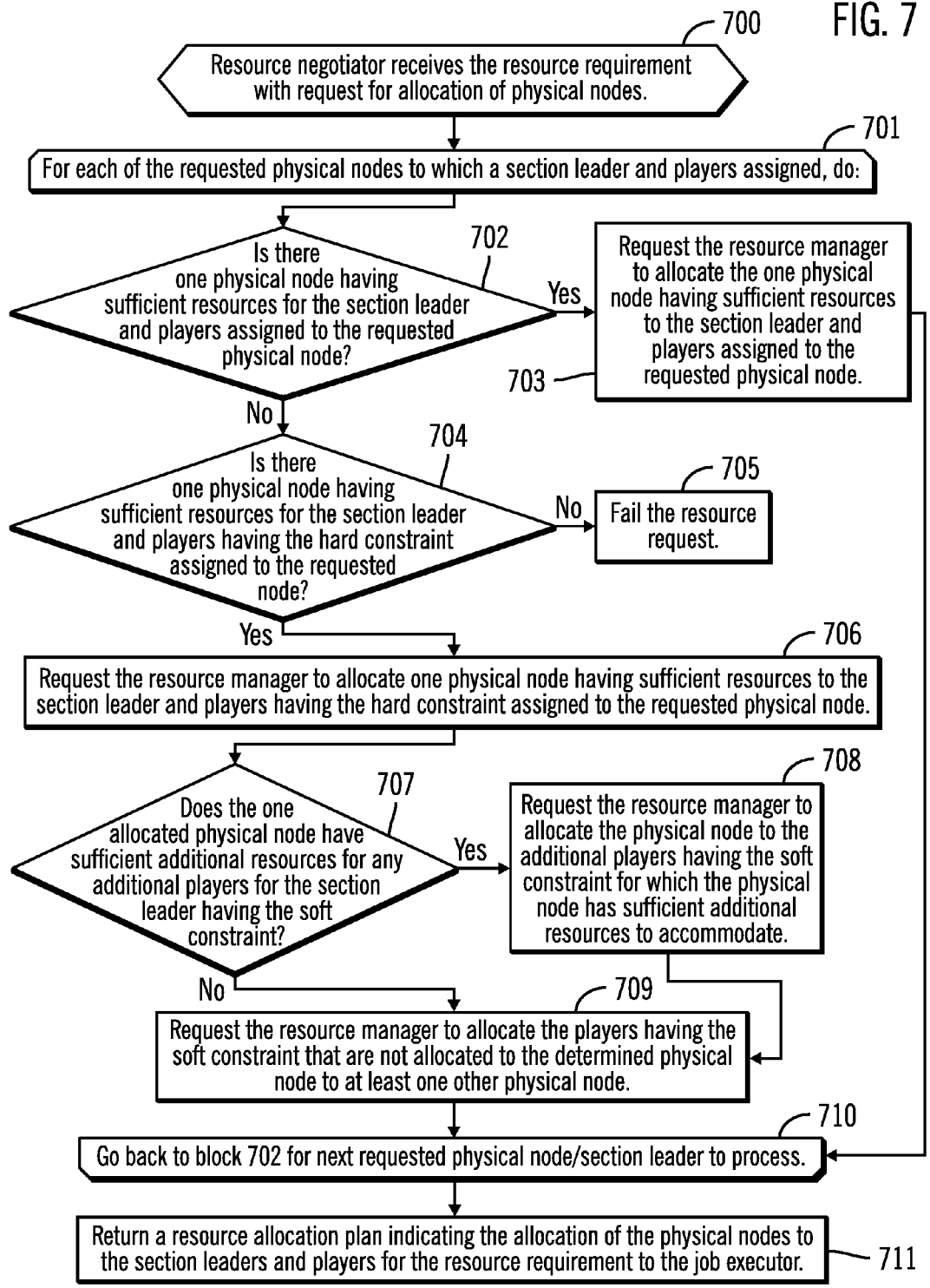
FIG. 7 illustrates an embodiment of operations to allocate physical nodes to processes identified in the resource requirement.

FIG. 7 illustrates an embodiment of operations performed by the resource negotiator 107 determine an allocation of physical nodes 120 to the processes in the received resource requirement 200. Upon receiving (at block 700) the resource requirement 200 with the request for allocation of physical nodes 120, the resource negotiator 107 performs a loop of operations at block 701 through 710 for each requested physical node to which a section leader and players are assigned. Alternatively, the resource negotiator 107 may perform the loop for each section leader. For a first requested physical node, the resource negotiator 107 processes the resource availability information 116 to determine (at block 702) whether there is one physical node 120 having sufficient available resources to handle the execution of the section leader and players assigned to the requested physical node, or to process one section leader and all its players. If so, then the resource negotiator 107 requests (at block 703) the resource manager 114 to allocate one physical node 120 having sufficient resources to the section leader and players assigned to the requested physical node. From block 703, control proceeds to block 710 to consider any further requested physical nodes, or section leaders. Otherwise, if (at block 702) there was no single one node 120 having sufficient resources for the section leader and players assigned to the considered requested physical node, then the resource manager 107 determines (at block 704) whether there is one physical node 120 having sufficient resources for the section leader and players having the hard constraint 210 assigned to the requested physical node (section leader). If (at block 705) there is no available physical node 120 that has sufficient resources for the section leader and all players having the hard constraint 210 indicated in the resource allocation instance 200, for the players, then the resource negotiator 107 fails (at block 705) the allocation request, and returns failure to the job extractor 106 that initiated the resource allocation request.

If (at block 704) there is an available physical node 120 that has sufficient resources for the section leader and all players having the hard constraint 210 indicated in the resource allocation instance 200, for the player, then the resource negotiator 107 requests (at block 706) the resource manager 114 to allocate the one physical node 120 having sufficient resources to the section leader and players having the hard constraint 210 assigned to the requested physical node. After requesting the allocation of the physical node 120, if (at block 707) the allocated physical node 120 has sufficient additional resources for any additional players having the soft constraint 210, then the resource negotiator 107 requests (at block 708) the resource manager 114 to allocate the physical node 120 to the additional players having the soft constraint for which the physical node has sufficient additional resources to accommodate. In one embodiment, the resource negotiator 107 may try to maximize the number of additional players having the soft constraint that are allocated to the available resources of the physical node. If after allocating the physical node 120 to the players having the hard constraint there are no players having a soft constraint, then control would proceed to block 710 to consider the next requested physical node or section leader.

If the requested allocated physical node 120 does not have sufficient resources for additional players (from the no branch of block 707) or after requesting allocation of additional players to the physical node (from block 708), the resource negotiator 107 allocates (at block 709) the players having the soft constraint that are not allocated to the determined physical node to at least one other physical node, so that players are split across multiple physical nodes 120 if they have the soft constraint.

After all processes, e.g., section leaders and players, have been allocated to the one or more physical nodes 120, the resource negotiator 107 returns (at block 711) a resource allocation plan 300 to the job executor 106 indicating the allocation of the physical nodes 120 to the processes included in the resource requirement 200, e.g., the allocation of physical nodes 120 to section leaders and players. The job executor 106 may then use the plan 300 to direct execution of the job.

In one embodiment, the resource negotiator 107 may send all the requests for physical nodes at blocks 703, 706, 708, and 709 in a single request to the resource manager 114. In this way, the resource negotiator 107 uses the received allocation from the resource manager 114 to create the resource allocation plan.

Certain embodiments are described with respect to allocating physical nodes to section leaders and players. In alternative embodiments, the physical nodes may be allocated to other types of processes, where certain of the processes may have a requirement to be allocated to the same physical node as other processes, yet other processes may only have a preference or soft constraint to be grouped with other processes.

Figure 8:
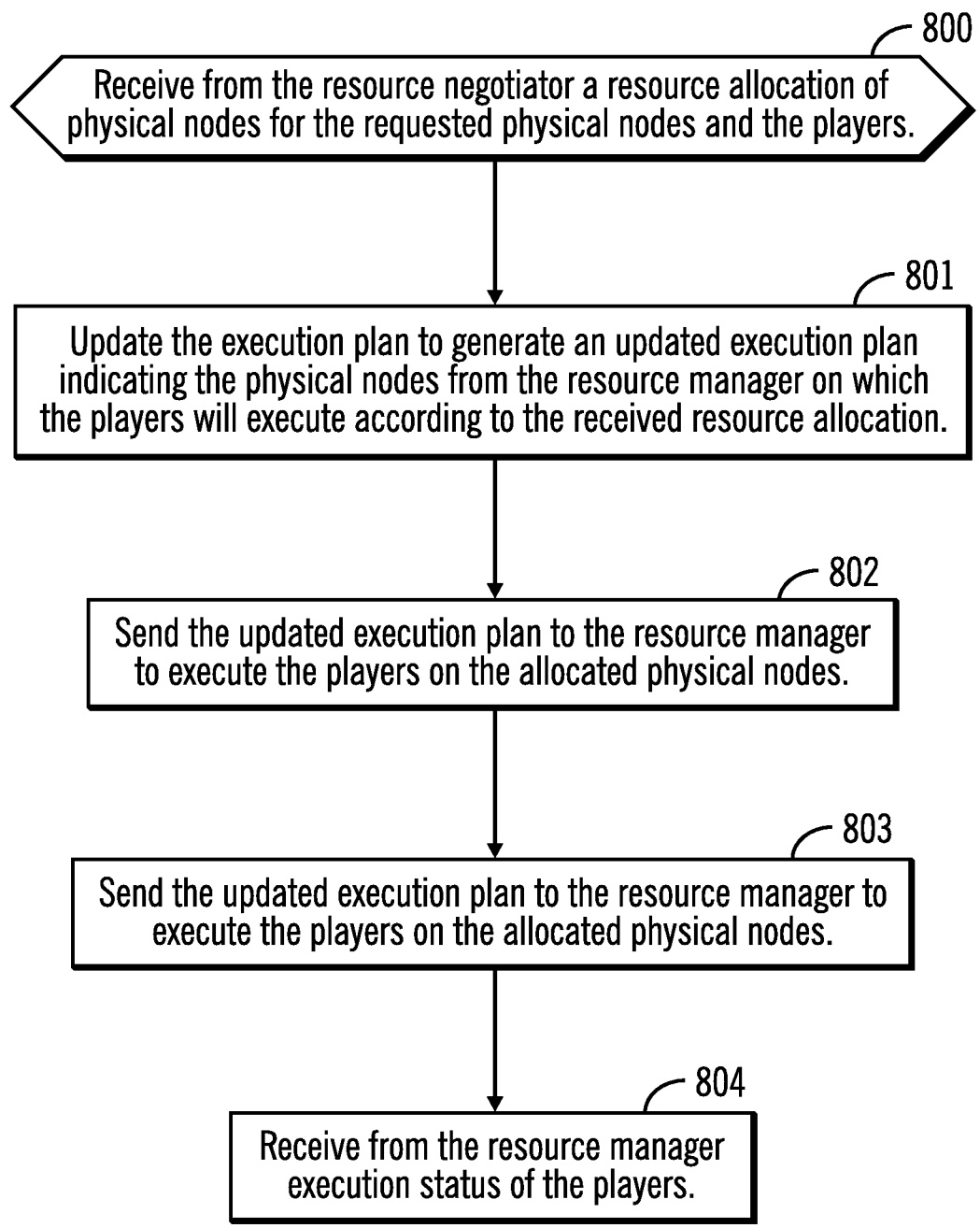
FIG. 8 illustrates an embodiment of operations to update an execution plan with the allocated physical nodes.

FIG. 8 illustrates an embodiment of operations performed by the job extractor 106 to process the resource allocation plan 300 returned from the resource negotiator 107. Upon receiving (at block 800) the resource allocation plan 300, the job executor 106 updates (at block 801) the execution plan 112 to generate an updated execution plan 112 indicating the physical nodes 120 allocated by the resource negotiator 107 on which the players will execute according to the received resource allocation plan 300. The updated execution plan 112 may replace the dummy names or placeholders for the requested physical node assigned to the processes (e.g., section leaders and players) within the plan 112 with the address of the physical nodes 120 on which they will run. The job executor 106 sends (at block 802) the updated execution plan 112 to the resource manager 114 to execute the processes (e.g., section leaders and players) on the allocated physical nodes 120. The job executor 106 may receive (at block 804) from the resource manager execution status of the processes in the updated execution plan 112.

The described embodiments provide a technique for the allocation of resources that occurs after the execution plan has been generated and the processes (e.g., section leader and players) have been allocated to placeholder nodes or requested section leader nodes. A resource requirement 200 is then generated that specifies the processes, such as section leaders and players, and the requested physical nodes on which they are preferred to execute. A resource negotiator may then determine an allocation of actual nodes to the processes and returns that allocation received from the resource manager 114 to the job executor 106 to use to update the execution plan with the physical nodes the resource manager provided for the processes. To optimize node assignment, the resource negotiator may assign a greater number of physical nodes than requested so that processes initially assigned to a requested physical node are allocated to multiple nodes to execute.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The reference characters used herein, such as i and n, are used herein to denote a variable number of instances of an element, which may represent the same or different values, and may represent the same or different value when used with different or the same elements in different described instances.

Figure 9:
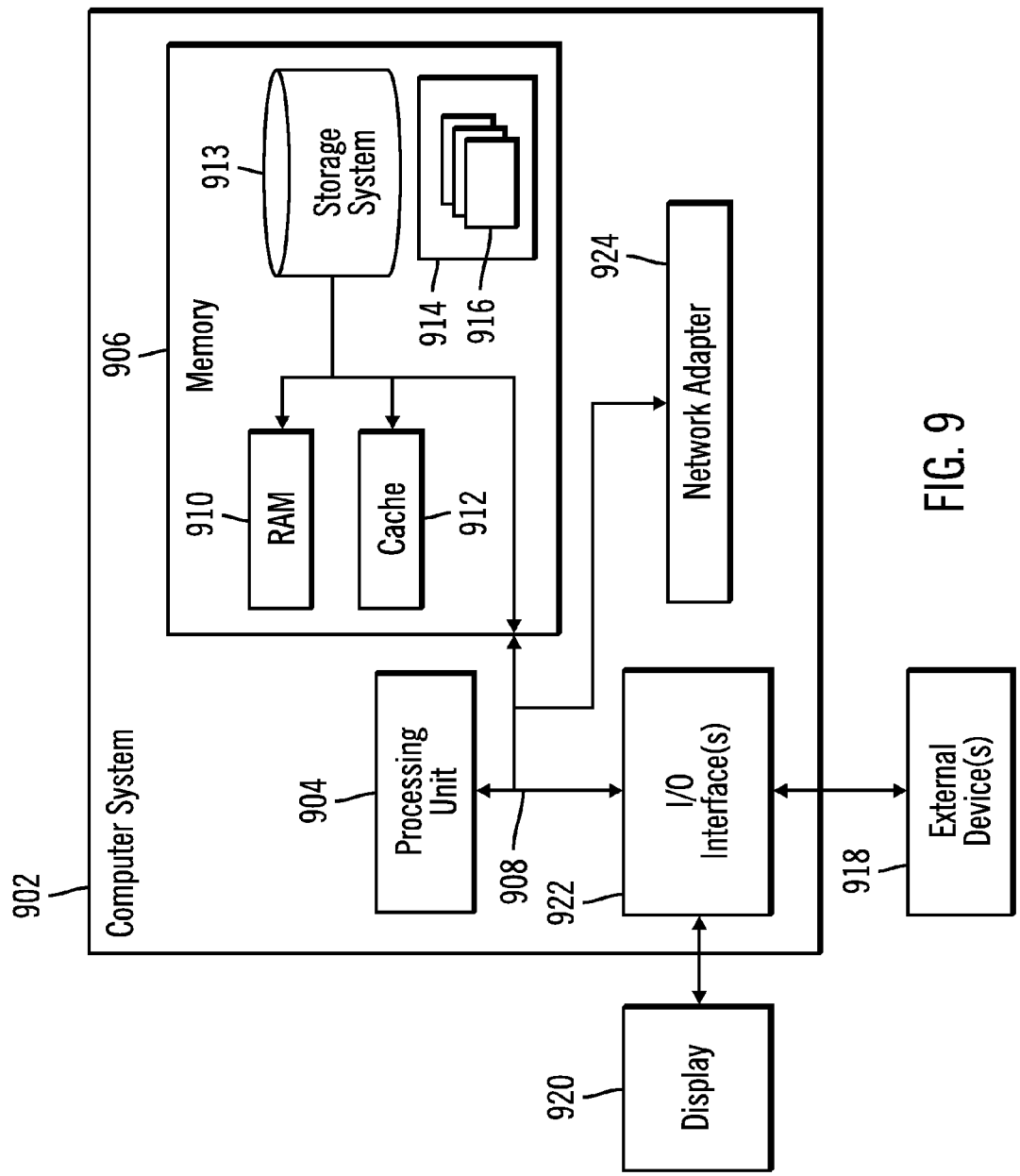
FIG. 9 illustrates an embodiment of computer systems in the computing environment.

FIG. 9 illustrates an embodiment of a computer system 902 which may comprise an implementation of physical nodes 120 and one or more computer systems 902 in which the job execution environment 102 and resource management environment 104 may be implemented. Computer system 902 is only one example of a suitable computing node and is not intended to suggest any limitation as to the scope of use or functionality of embodiments of the invention described herein. Regardless, computer node 902 is capable of being implemented and/or performing any of the functionality set forth hereinabove.

The computer node 902 is operational with numerous other general purpose or special purpose computing system environments or configurations. Examples of well-known computing systems, environments, and/or configurations that may be suitable for use with computer node 902 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 902 may be described in the general context of computer system executable instructions, such as program modules, being executed by a computer system. Generally, program modules may include routines, programs, objects, components, logic, data structures, and so on that perform particular tasks or implement particular abstract data types. Computer node 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer node 902 is shown in the form of a general-purpose computing device. The components of computer system/server 902 may include, but are not limited to, one or more processors or processing units 904, a system memory 906, and a bus 908 that couples various system components including system memory 906 to processor 904.

Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 902 typically includes a variety of computer system readable media. Such media may be any available media that is accessible by computer node 902, and it includes both volatile and non-volatile media, removable and non-removable media, and may be used for storing the programs and data used by the programs.

System memory 906 can include computer system readable media in the form of volatile memory, such as random access memory (RAM) 910 and/or cache memory 912. Computer node 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules etc., and program data. Each of the operating system, one or more application programs, other program modules, and program data or some combination thereof, may include an implementation of a networking environment. Program modules 916 generally carry out the functions and/or methodologies of embodiments of the invention as described herein.

Computer node 902 may also communicate with one or more external devices 918 such as a keyboard, a pointing device, a display 920, etc.; one or more devices that enable a user to interact with the computer node 902; and/or any devices (e.g., network card, modem, etc.) that enable computer system/server 902 to communicate with one or more other computing devices. Such communication can occur via Input/Output (I/O) interfaces 922. Still yet, computer node 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method for obtaining resources for an execution plan, comprising:
    generating an execution plan indicating a plurality of processes;
    generating a resource requirement indicating a plurality of requested physical nodes and an assignment of the processes to execute on the requested physical nodes;
    determining from the resource requirement a resource allocation of physical nodes for the requested physical nodes and the processes by:
        determining whether there is one physical node having sufficient resources for the processes allocated to a requested physical node of the requested physical nodes;
        allocating the determined one physical node to the processes assigned to the requested physical node in response to determining that there is one physical node having the sufficient resources;
        in response to determining that there is no one physical node having sufficient resources for the processes assigned to the requested physical node, determining whether there is a soft constraint or hard constraint indicated for the processes assigned to the requested physical node; and
        allocating multiple physical nodes for the processes allocated to the requested physical node in response to determining that the soft constraint is indicated for at least one of the processes assigned to the requested physical node for which no one physical node is determined; and
    updating the execution plan to generate an updated execution plan indicating the physical nodes on which the processes will execute according to the resource allocation.

2. The method of claim 1, wherein the processes include section leaders and players, wherein each of the players are assigned to one of a plurality of section leaders, wherein the resource requirement assigns each of the section leaders and the players assigned to the section leader to one of the requested physical nodes to prefer an allocation of each of the section leaders and the players assigned to the section leader to a separate of the physical nodes.

3. The method of claim 1, further comprising:
generating a configuration file template providing placeholder names for the requested physical nodes, wherein the generated execution plan assigns the processes to execute on the placeholder names for the requested physical nodes.

4. The method of claim 1, wherein the allocating multiple physical nodes for one of the requested physical nodes comprises allocating a minimum number of physical nodes having sufficient resources for the processes that are assigned to the requested physical node.

5. The method of claim 1, further comprising:
returning fail to a request for an allocation of physical nodes in response to determining that the hard constraint is indicated for the processes.

6. The method of claim 1, wherein the execution plan is for an extract, transform, and load ("ETL") program, wherein the processes include a conductor, section leaders, and players assigned to the section leaders, wherein the conductor manages execution of the section leaders and the players, and wherein the section leaders manage execution of players assigned to the section leaders.

7. A method for obtaining resources for an execution plan, comprising:
generating an execution plan indicating a plurality of section leaders and players, wherein each of the players are assigned to a section leader of the plurality of section leaders;
generating a resource requirement indicating a plurality of requested physical nodes and an assignment of the section leaders and players to execute on the requested physical nodes, wherein the resource requirement indicates, for each of the players, one of a soft constraint and a hard constraint, wherein the soft constraint for the player indicates a preference to allocate the player to a physical node of the physical nodes on which the section leader for the player is allocated, wherein the preference of the soft constraint can be relaxed if one physical node cannot be located having sufficient resources to execute all the players of the section leader, wherein the hard constraint for the player indicates a requirement to assign the player to the physical node including the section leader for the player;
determining from the resource requirement a resource allocation of physical nodes to the section leaders and players by:
determining whether there is one physical node having sufficient resources for the section leader and players allocated to the requested physical node;
allocating the determined one physical node to the section leader and players assigned to the requested physical node in response to determining that there is one physical node having the sufficient resources; and
allocating multiple physical nodes for the section leader and players assigned to the requested physical node when there is not one physical node having sufficient resources for the section leader and players assigned to the requested physical node; and
updating the execution plan to generate an updated execution plan indicating the physical nodes on which the section leaders and players will execute according to the resource allocation.

8. The method of claim 7, further comprising:
in response to determining that there is no one physical node having sufficient resources for the players assigned to the section leader for one of the requested physical nodes, determining whether all players assigned to the section leader having the hard constraint can be allocated to one physical node having the section leader; and
in response to determining that all players having the hard constraint can be allocated to the one physical node having the section leader, performing:
allocating the section leader and the players having the hard constraint to a first physical node having sufficient resources; and
allocating at least one of the players having the soft constraint to a second physical node.

9. The method of claim 8, further comprising:
returning fail to a request to allocate physical nodes in response to determining that there is not one physical node having sufficient resources for the section leader and all the players assigned to the section leader having the hard constraint and the soft constraint.

10. The method of claim 7, wherein the resource allocation allocates a player of the players having the soft constraint to execute on one of the physical nodes that is not also allocated to the section leader of the player having the soft constraint.

* * * * *